United States Patent
Mizokuchi (10) Patent No.: US 11,686,960 B2
(45) Date of Patent: Jun. 27, 2023

(54) OPTICAL FORMING DEVICE AND OPTICAL MODULATION DEVICE

(71) Applicant: Tianma Japan, Ltd., Kanagawa (JP)

(72) Inventor: Chikaaki Mizokuchi, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 0 days.

(21) Appl. No.: 17/497,279

(22) Filed: Oct. 8, 2021

(65) Prior Publication Data

US 2022/0113567 A1    Apr. 14, 2022

(30) Foreign Application Priority Data

Oct. 8, 2020    (JP) .................................. 2020-170625

(51) Int. Cl.
*G02F 1/13*    (2006.01)
*G02F 1/1343*    (2006.01)

(52) U.S. Cl.
CPC ........ *G02F 1/1303* (2013.01); *G02F 1/13439* (2013.01); *G02F 2202/023* (2013.01)

(58) Field of Classification Search
None
See application file for complete search history.

(56) References Cited

U.S. PATENT DOCUMENTS

| | | | | |
|---|---|---|---|---|
| 2007/0002245 | A1* | 1/2007 | Lee ................... | G02F 1/134363 349/141 |
| 2009/0184444 | A1* | 7/2009 | Honda ................... | B33Y 30/00 264/401 |
| 2010/0165450 | A1* | 7/2010 | Okuyama ......... | G02F 1/133615 156/182 |
| 2011/0002039 | A1* | 1/2011 | Seo ...................... | G02B 27/285 427/510 |
| 2019/0353964 | A1* | 11/2019 | Long ................. | G02F 1/136286 |
| 2020/0055251 | A1* | 2/2020 | Medalsy ................. | B29C 64/30 |
| 2021/0132437 | A1* | 5/2021 | Mizokuchi .......... | B29C 35/0805 |
| 2021/0178684 | A1* | 6/2021 | Mizokuchi ............... | C08F 2/46 |

FOREIGN PATENT DOCUMENTS

JP    07-232383 A    9/1995

* cited by examiner

*Primary Examiner* — Ryan Crockett
(74) *Attorney, Agent, or Firm* — Sughrue Mion, PLLC (57) ABSTRACT

An optical forming device includes a resin tank that holds a photocurable resin, a light source that emits light for curing the photocurable resin, and an optical modulator. The optical modulator includes a liquid crystal, a first substrate and a second substrate that sandwich the liquid crystal, and a first electrode and a second electrode that apply voltage to the liquid crystal. The optical modulator modulates, in a pattern based on the shape of a three-dimensional shaped object, light that causes the photocurable resin to cure, and irradiates the modulated light on the photocurable resin. The optical modulator includes a plurality of modulation regions including a first region and a second region that have mutually different voltage transmittance characteristics.

10 Claims, 8 Drawing Sheets

OPTICAL FORMING DEVICE AND OPTICAL MODULATION DEVICE

CROSS-REFERENCE TO RELATED APPLICATION

This application claims the benefit of Japanese Patent Application No. 2020-170625, filed on Oct. 8, 2020, the entire disclosure of which is incorporated by reference herein.

FIELD

This application relates generally to an optical forming device and an optical modulation device.

BACKGROUND

Techniques are known for shaping a three-dimensional shaped object by irradiating a photocurable resin with light on the basis of the cross-sectional shape of the three-dimensional shaped object. For example, Japanese Unexamined Patent Application Publication No. H07-232383 describes a device for shaping a three-dimensional shaped object by selectively irradiating a photocurable resin with light using a liquid crystal shutter, and a method for shaping a three-dimensional shaped object.

In Japanese Unexamined Patent Application Publication No. H07-232383, the photocurable resin is selectively irradiated with light using the liquid crystal shutter to cause one layer of the photocurable resin to cure and, thereafter, the cured photocurable resin is moved in a direction away from the liquid crystal shutter. Then, using the liquid crystal shutter, photocurable resin that is poured on the cured photocurable resin is selectively irradiated with light to cause the next one layer of the photocurable resin to cure. In Japanese Unexamined Patent Application Publication No. H07-232383, the three-dimensional shaped object is shaped by repeating these steps.

When shaping a shaped object having a wide cross-sectional area at high resolution, the device of Japanese Unexamined Patent Application Publication No. H07-232383 must be provided with a large high-definition liquid crystal shutter. Many driver integrated circuits (IC) are needed to drive large high-definition liquid crystal shutters, and the circuits that drive such liquid crystal shutters are complex.

SUMMARY

An optical forming device according to a first aspect of the present disclosure includes:
a resin tank that holds a photocurable resin;
a light source that emits light for curing the photocurable resin; and
an optical modulator that includes a liquid crystal, a first substrate and a second substrate that sandwich the liquid crystal, and a first electrode and a second electrode that apply voltage to the liquid crystal, modulates the light in a pattern based on a shape of a three-dimensional shaped object, and irradiates the modulated light on the photocurable resin, wherein
the optical modulator includes a plurality of modulation regions including a first region and a second region that have mutually different voltage transmittance characteristics,
the liquid crystal is aligned in a direction parallel to a main surface of the first substrate and the first electrode and the second electrode apply voltage to the liquid crystal to rotate the liquid crystal in a plane parallel to the main surface of the first substrate, in a first state in which a predetermined first voltage is applied to the liquid crystal,
the first region and the second region have transmittances that are lower than a predetermined transmittance,
in a second state in which a predetermined second voltage is applied to the liquid crystal, the first region has a transmittance that is greater than or equal to the predetermined transmittance, and the second region has a transmittance that is lower than the predetermined transmittance,
in a third state in which a predetermined third voltage is applied to the liquid crystal, the first region and the second region have transmittances that are greater than or equal to the predetermined transmittance,
in a fourth state in which a predetermined fourth voltage is applied to the liquid crystal, the first region has a transmittance that is less than the predetermined transmittance, and the second region has a transmittance that is greater than or equal to the predetermined transmittance, and
the photocurable resin cures when the transmittance of the first region or the second region is greater than or equal to the predetermined transmittance.

An optical modulation device according to a second aspect of the present disclosure includes:
a plurality of modulation regions that includes a first region and a second region that have mutually different voltage transmittance characteristics, and that modulates incident light;
a liquid crystal, a first substrate and a second substrate that sandwich the liquid crystal, and a first electrode and a second electrode that apply voltage to the liquid crystal, wherein
the liquid crystal is aligned in a direction parallel to a main surface of the first substrate and the first electrode and the second electrode apply voltage to the liquid crystal to rotate the liquid crystal in a plane parallel to the main surface of the first substrate, in a first state in which a predetermined first voltage is applied to the liquid crystal, the first region and the second region have transmittances that are lower than a predetermined transmittance,
in a second state in which a predetermined second voltage is applied to the liquid crystal, the first region has a transmittance that is greater than or equal to the predetermined transmittance, and the second region has a transmittance that is lower than the predetermined transmittance,
in a third state in which a predetermined third voltage is applied to the liquid crystal, the first region and the second region have transmittances that are greater than or equal to the predetermined transmittance, and
in a fourth state in which a predetermined fourth voltage is applied to the liquid crystal, the first region has a transmittance that is less than the predetermined transmittance, and the second region has a transmittance that is greater than or equal to the predetermined transmittance.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, an optical forming device according to various embodiments is described while referencing the drawings.

Embodiment 1

An optical forming device 100 according to the present embodiment is described while referencing FIGS. 1 to 8. The optical forming device 100 shapes a three-dimensional object Ob from a photocurable resin RL.

Figure 1:
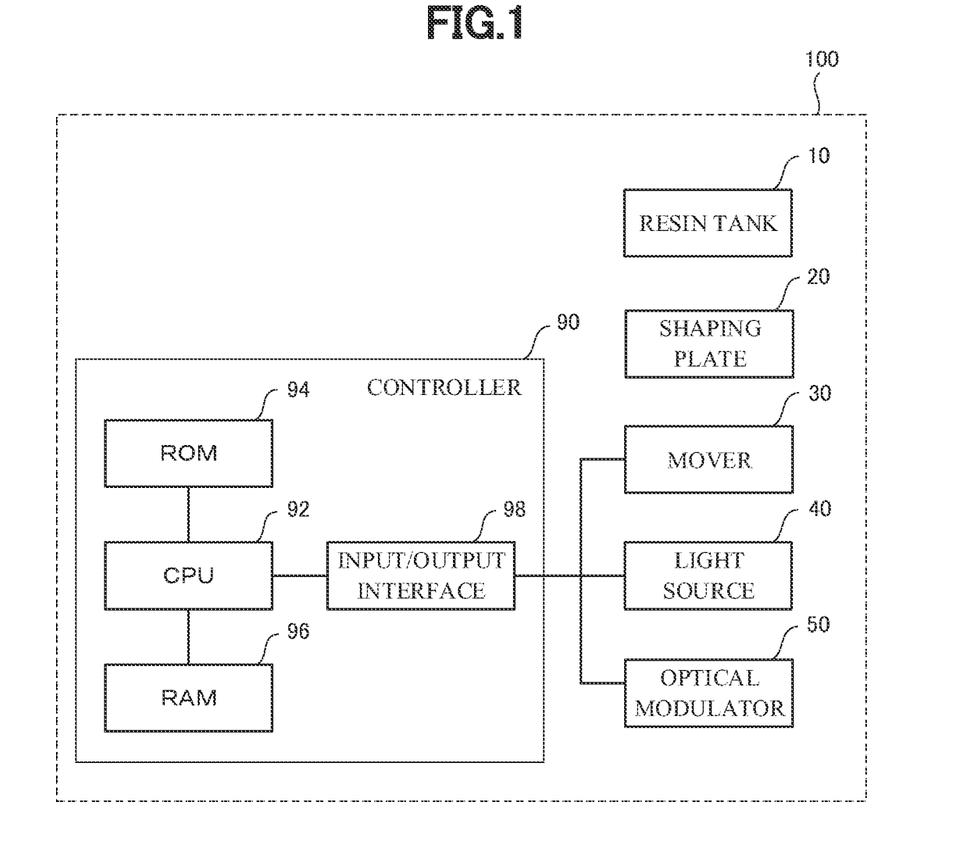
FIG. 1 is a drawing illustrating the configuration of an optical forming device according to Embodiment 1.
Figure 2:
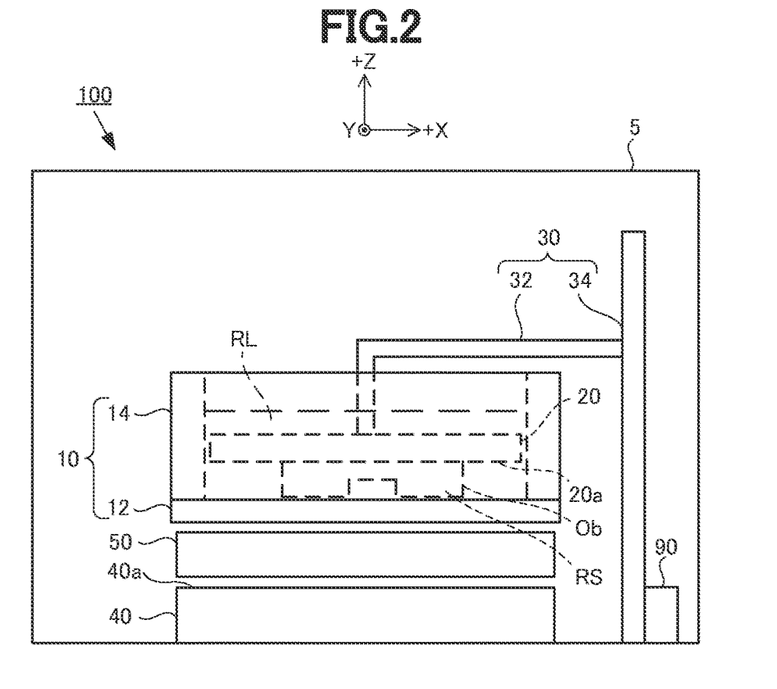
FIG. 2 is a schematic drawing illustrating the optical forming device according to Embodiment 1.

As illustrated in FIGS. 1 and 2, the optical forming device 100 includes, in a housing 5, a resin tank 10, a shaping plate 20, a mover 30, a light source 40, an optical modulator 50, and a controller 90. The resin tank 10 holds the photocurable resin RL. The three-dimensional object Ob is shaped on a face 20a of the shaping plate 20. The mover 30 moves the shaping plate 20. The light source 40 emits light that causes the photocurable resin RL to cure. The optical modulator 50 modulates that light, that causes the photocurable resin RL to cure, in a pattern based on the shape of the three-dimensional object Ob. The controller 90 controls the various components of the optical forming device 100. In the present description, to facilitate comprehension, in the optical forming device 100 of FIG. 2, the right direction (the right direction on paper) is referred to as the "+X direction", the up direction (the up direction on paper) is referred to as the "+Z direction", and the direction (the front direction on paper) perpendicular to the +X direction and the +Z direction is referred to as the "+Y direction." The light that causes the photocurable resin RL to cure is also referred to as "curing light."

As illustrated in FIG. 2, the resin tank 10 of the optical forming device 100 holds the photocurable resin RL. The resin tank 10 is a box-shaped container. The +Z-direction face of the resin tank 10 is open. The resin tank 10 has a bottom 12 and a wall 14.

The bottom 12 of the resin tank 10 transmits the curing light emitted from the light source 40. In one example, the bottom 12 is implemented as flat plate-like glass. The wall 14 of the resin tank 10 blocks the curing light. The wall 14 is formed from a resin, a metal, or the like.

Next, the photocurable resin RL is described. The photocurable resin RL is implemented as a liquid resin that cures as a result of being irradiated with light of a predetermined wavelength. In the present embodiment, the photocurable resin RL cures as a result of being irradiated with the light (the curing light) emitted from the light source 40. The photocurable resin RL includes monomers, oligomers, a polymerization initiator, and the like. The polymerization initiator absorbs the curing light emitted from the light source 40 to generate active species such as radicals, ions, and the like, and causes the monomers, oligomers, and the like to initiate a polymerization reaction. In the present embodiment, the photocurable resin RL is an ultraviolet (UV) curable resin.

The shaping plate 20 of the optical forming device 100 is a flat plate that is made from resin or metal. As illustrated in FIG. 2, the shaping plate 20 is disposed on the +Z side with respect to the bottom 12 of the resin tank 10. In an initial state of the optical forming device 100, the shaping plate 20 is positioned in the resin tank 10 (initial position of the shaping plate 20). The shaping plate 20 is moved in the +Z-direction and the −Z-direction by the mover 30. The three-dimensional object Ob is shaped on the face 20a of the shaping plate 20. The face 20a faces the bottom 12 of the resin tank 10.

The mover 30 of the optical forming device 100 moves the shaping plate 20 in the +Z-direction and the −Z-direction. The mover 30 includes an arm 32 and a movement mechanism 34. The arm 32 of the mover 30 connects the shaping plate 20 to the movement mechanism 34. The movement mechanism 34 of the mover 30 moves the shaping plate 20 in the +Z-direction and the −Z-direction via the arm 32. The movement mechanism 34 includes a motor, a ball screw, a slider, and the like (not illustrated in the drawings).

The light source 40 of the optical forming device 100 emits the curing light (that is, light that causes the photocurable resin RL to cure) toward the photocurable resin RL (the +Z-direction). In the present embodiment, the light source 40 is disposed on the −Z side of the resin tank 10. The light source 40 emits, in the +Z-direction, UV light from a top surface 40a positioned on the resin tank 10 side. The light source 40 includes a reflecting sheet, a light emitting diode (LED) that emits UV light, a diffusing sheet, and the like. In one example, the wavelength having the maximum intensity of the UV light emitted from the light source 40 is 405 nm.

Figure 3:
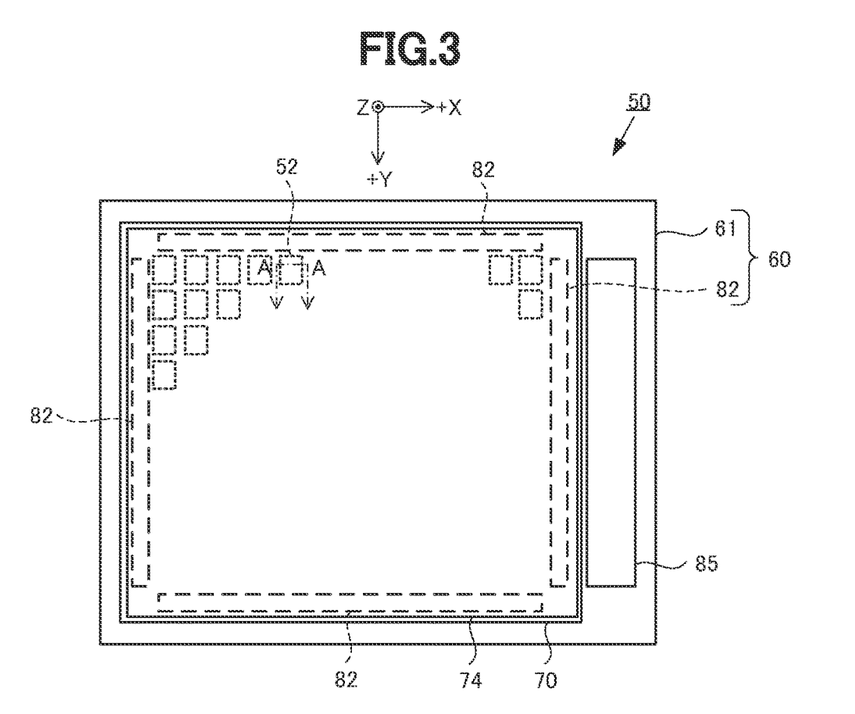
FIG. 3 is a top view illustrating an optical modulator according to Embodiment 1.

As illustrated in FIG. 2, the optical modulator 50 of the optical forming device 100 is disposed between the resin tank 10 and the light source 40. The optical modulator 50 modulates the curing light emitted from the light source 40 in a pattern based on the shape of the three-dimensional object Ob, and irradiates the modulated curing light on the photocurable resin RL through the bottom 12 of the resin tank 10. As illustrated in FIG. 3, the optical modulator 50 includes modulation regions 52 that are arranged in a matrix and that modulate the curing light. The optical modulator 50 is a transverse electric field driven liquid crystal panel that is driven by thin film transistors (TFT). In the present embodiment, the optical modulator 50 operates in an in-plane switching mode. Note that FIG. 3 illustrates only a portion of the plurality of modulation regions 52.

Figure 4:
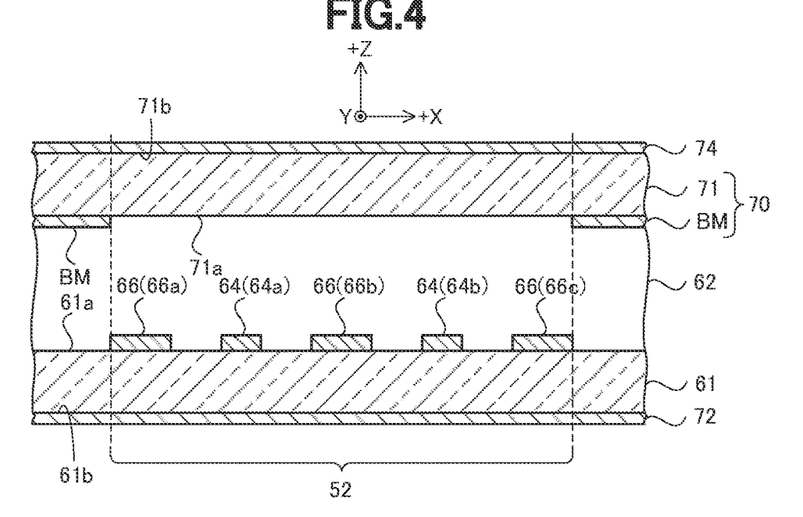
FIG. 4 is a cross-sectional view of the optical modulator illustrated in FIG. 3, taken along line A-A.

As illustrated in FIG. 3, the optical modulator 50 includes a TFT substrate 60, a counter substrate 70, and a driver IC 85. Additionally, as illustrated in FIG. 4, the optical modulator 50 includes a liquid crystal 62, a first electrode 64, a second electrode 66, a first polarizing plate 72, and a second polarizing plate 74.

Firstly, the TFT substrate 60, the counter substrate 70, the first polarizing plate 72, the second polarizing plate 74, and the driver IC 85 are described.

As illustrated in FIG. 3, the TFT substrate 60 of the optical modulator 50 includes a first substrate 61 and driver circuits 82. In one example, the first substrate 61 is implemented as a glass substrate. As illustrated in FIG. 4, the first electrode 64 and the second electrode 66 that apply voltage to the liquid crystal 62 are provided on a first main surface 61a of the first substrate 61. The first polarizing plate 72 is provided on a second main surface 61b of the first substrate 61.

TFTs for selecting the modulation region 52, a light-shielding film that protects the TFTs from the curing light, an alignment film that aligns the liquid crystal 62, and the like (all not illustrated in the drawings) are provided on the first main surface 61a of the first substrate 61. Furthermore, a plurality of common wires, a plurality of signal wires, and a plurality of scanning wires (all not illustrated in the drawings) are formed on the first main surface 61a of the first substrate 61. The common wires supply common potential to the first electrode 64. The signal wires supply voltage to the second electrode 66, and the scanning wires supply voltage that causes the TFTs to operate. The modulation regions 52 are surrounded by the signal wires and the scanning wires. The TFTs are provided at intersections between the scanning wires and the signal wires. The signal wires and the second electrode 66 are connected to each other via the TFTs.

As illustrated in FIG. 3, the driver circuits 82 are provided at positions surrounding the region in which the modulation regions 52 are arranged. The driver circuits 82 supply the voltage to the scanning wires, the signal wires, and the common wires.

As illustrated in FIG. 4, the counter substrate 70 of the optical modulator 50 faces the TFT substrate 60, and is adhered to the TFT substrate 60 by a non-illustrated sealing material. The counter substrate 70 includes a second substrate 71, and a black matrix BM. In one example, the second substrate 71 is implemented as a glass substrate. The black matrix BM and an alignment film that aligns the liquid crystal 62 are provided on a first main surface 71a of the second substrate 71. The second polarizing plate 74 is provided on a second main surface 71b of the second substrate 71.

Additionally, the second substrate 71 and the first substrate 61 of the TFT substrate 60 sandwich the liquid crystal 62.

The black matrix BM is provided in a lattice shape on the first main surface 71a of the second substrate 71. The black matrix BM defines the modulation regions 52. The black matrix BM is formed from black resin, chrome, or the like.

The first polarizing plate 72 of the optical modulator 50 is provided on the second main surface 61b of the first substrate 61. The polarization axis of the first polarizing plate 72 is disposed parallel to the alignment direction (the +Y-direction) of the liquid crystal 62.

The second polarizing plate 74 of the optical modulator 50 is provided on the second main surface 71b of the second substrate 71. The polarization axis of the second polarizing plate 74 is disposed in a cross-Nicol alignment with respect to the polarization axis of the first polarizing plate 72. Accordingly, the optical modulator 50 operates in a normally black mode.

The driver IC 85 of the optical modulator 50 is provided on the first substrate 61 of the TFT substrate 60. The driver IC 85 supplies power, timing signals, and the like to the driver circuits 82. The driver IC 85 is connected to the controller 90 via a non-illustrated flexible printed circuit (FPC).

Next, the liquid crystal 62, the first electrode 64, the second electrode 66, and the modulation regions 52 are described.

The liquid crystal 62 of the optical modulator 50 is sandwiched between the first substrate 61 of the TFT substrate 60 and the second substrate 71 of the counter substrate 70. In a state in which voltage is not applied, the liquid crystal 62 is aligned in a direction parallel to the first main surface 61a of the first substrate 61 by the alignment films provided on the first substrate 61 and the second substrate 71. Additionally, the liquid crystal 62 rotates in a plane parallel to the first main surface 61a of the first substrate 61 due to the voltage applied by the first electrode 64 and the second electrode 66. In the present embodiment, the liquid crystal 62 is implemented as a positive-type nematic liquid crystal aligned in the +Y-direction.

The first electrode 64 and the second electrode 66 of the optical modulator 50 apply voltage to the liquid crystal 62. The first electrode 64 is connected to the common wires and functions as a common electrode. The second electrode 66 is connected to the signal wires via the TFTs and functions as a drive electrode.

Figure 5:
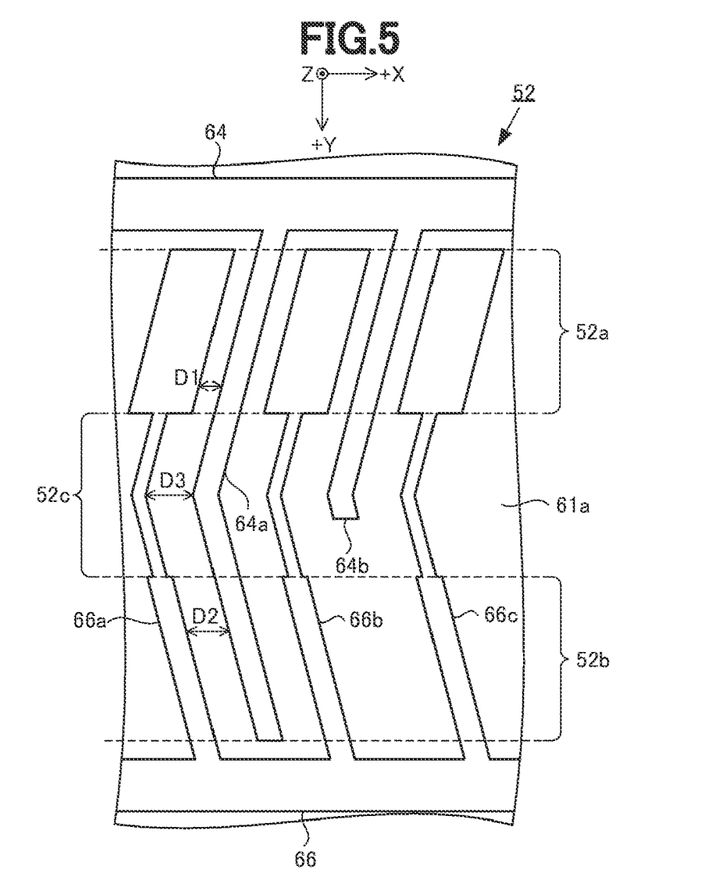
FIG. 5 is a top view illustrating a modulation region according to Embodiment 1.

As illustrated in FIG. 5, the first electrode 64 and the second electrode 66 are formed on the first main surface 61a of the first substrate 61. The first electrode 64 and the second electrode 66 are formed in a comb tooth shape, from indium tin oxide (ITO). The first electrode 64 includes comb teeth 64a, 64b that extend in the alignment direction (the +Y direction) of the liquid crystal 62. The comb teeth 64a, 64b are bent in a V-shape. The second electrode 66 includes comb teeth 66a, 66b, 66c that extend in a direction (the −Y-direction) opposite the comb teeth 64a, 64b of the first electrode 64. The comb teeth 66a, 66b, 66c are bent in a V-shape. The comb teeth 66a, 66b, 66c of the second electrode 66 and the comb teeth 64a, 64b of the first electrode 64 are arranged alternately in the X-direction, parallel to each other. Due to this configuration, a transverse electric field in the X-direction and parallel to the first main surface 61a of the first substrate 61 is generated between the comb tooth 66a and the comb tooth 64a, between the comb tooth 64a and the comb tooth 66b, between the comb tooth 66b and the comb tooth 64b, and between the comb tooth 64b and the comb tooth 66c. The liquid crystal 62 rotates in a plane parallel to the first main surface 61a of the first substrate 61 due to the transverse electric field in the X-direction and parallel to the first main surface 61a of the first substrate 61.

Details of the comb teeth 64a, 64b of the first electrode 64 and the comb teeth 66a, 66b, 66c of the second electrode 66 are described later.

The modulation regions 52 of the optical modulator 50 are arranged in a matrix, and modulate the curing light emitted from the light source 40. As illustrated in FIG. 5, each modulation region 52 includes three regions. Note that, in FIG. 5, to facilitate comprehension, the first polarizing plate 72 and the second polarizing plate 74 are not illustrated.

A first region 52a of the modulation region 52 is located on the root side (the −Y-direction side) of the comb teeth 64a, 64b of the first electrode 64. A second region 52b of the modulation region 52 is located on the root side (the +Y-direction side) of the comb teeth 66a, 66b, 66c of the second electrode 66. A third region 52c of the modulation region 52 is located between the first region 52a and the second region 52b. The spacing between the disposed comb teeth 64a, 64b and the comb teeth 66a to 66c differs in the first region 52a, the second region 52b, and the third region 52c. As such, the first region 52a, the second region 52b, and the third region 52c have mutually different voltage transmittance characteristics.

A spacing D1 of the comb teeth 66a, 64a, 66b, 64b, 66c in the first region 52a is set to be narrowest by increasing the width of the comb teeth 66a, 66b, 66c, and the transmittance changes with the lowest voltage in the first region 52a (that is, the drive voltage of the liquid crystal 62 is lowest). A spacing D2 of the comb teeth 66a, 64a, 66b in the second region 52b is set to be wider than the spacing of the comb teeth 64a, 66b, 64b, 66c in the first region 52a, and the transmittance changes with voltage higher than in the first region in the second region 52b (that is, the drive voltage of the liquid crystal 62 is higher than that in the first region 52a).

A spacing D3 of the comb teeth 66a, 64a, 66b, 64b, 66c in the third region 52c is set to be widest by reducing the width of the comb teeth 66a, 66b, 66c, and the transmittance changes with the highest voltage in the third region 52c (that is, the drive voltage of the liquid crystal 62 is highest).

In the following, a detailed description is given, while referencing FIG. 6, of the voltage transmittance characteristics of the first region 52a, the second region 52b, and the third region 52c, and the curing states of the photocurable resin RL. Note that the comb tooth 64b of the first electrode 64 is not disposed in the second region 52b. The reason for this configuration is described later.

The spacings of the comb teeth 64a, 64b, and 66a to 66c are adjusted to set the transmittances of the first region 52a, the second region 52b, and the third region 52c to be greater than or equal to, or less than, a predetermined transmittance Ts when each of a predetermined first voltage V1 to fourth voltage V4 is applied to the liquid crystal 62. Voltage values of the various voltages increase in order of the first voltage V1, the second voltage V2, the third voltage V3, and the fourth voltage V4. The predetermined transmittance Ts is a transmittance at which the energy per unit area of the curing light irradiated on the photocurable resin RL reaches a critical exposure amount of the photocurable resin RL. The phrase "critical exposure amount of the photocurable resin RL" refers to the minimum energy per unit area needed for the photocurable resin RL to cure. For example, the critical exposure amount of a urethane-acrylate photocurable resin is about 0.8 mJ/cm². Accordingly, when the transmittance of any region of the modulation region 52 is greater than or equal to the predetermined transmittance Ts, the photocurable resin RL of the region corresponding to that region cures. Additionally, when the transmittance of any region of the modulation region 52 is less than the predetermined transmittance Ts, the photocurable resin RL of the region corresponding to that region does not cure. Note that, the predetermined first voltage V1 to fourth voltage V4 are individually referred to as "first voltage V1", "second voltage V2", "third voltage V3", and "fourth voltage V4." Additionally, the predetermined transmittance Ts is referred to as "critical transmittance Ts."

Firstly, the first region 52a is described. As illustrated in FIG. 6, in a first state in which the lowest first voltage V1 is applied to the liquid crystal 62, the transmittance of the first region 52a is less than the critical transmittance Ts. In a second state in which the second voltage V2 that is greater than the first voltage V1 is applied to the liquid crystal 62, the transmittance of the first region 52a is greater than or equal to the critical transmittance Ts. In a third state in which the third voltage V3 that is greater than the second voltage V2 is applied to the liquid crystal 62, the transmittance of the first region 52a is less than the maximum transmittance, but greater than or equal to the critical transmittance Ts. In a fourth state in which the largest fourth voltage V4 is applied to the liquid crystal 62, the transmittance of the first region 52a is less than the critical transmittance Ts.

Accordingly, in the first state in which the first voltage V1 is applied to the liquid crystal 62 and in the fourth state in which the fourth voltage V4 is applied to the liquid crystal 62, the photocurable resin RL of the region corresponding to the first region 52a does not cure. However, in the second state in which the second voltage V2 is applied to the liquid crystal 62 and in the third state in which the third voltage V3 is applied to the liquid crystal 62, the photocurable resin RL of the region corresponding to the first region 52a cures.

Next, the second region 52b is described. In the first state in which the first voltage V1 is applied to the liquid crystal 62, as with the first region 52a, the transmittance of the second region 52b is less than the critical transmittance Ts. In the second state in which the second voltage V2 is applied to the liquid crystal 62, as illustrated in FIG. 6, the transmittance of the second region 52b where the drive voltage is higher than that in the first region 52a is maintained at a state less than the critical transmittance Ts. In the third state in which the third voltage V3 is applied to the liquid crystal 62, the transmittance of the second region 52b is greater than or equal to the critical transmittance Ts. In the fourth state in which the fourth voltage V4 is applied to the liquid crystal 62, the transmittance of the second region 52b is less than the maximum transmittance, but greater than or equal to the critical transmittance Ts.

Accordingly, in the first state in which the first voltage V1 is applied to the liquid crystal 62 and in the second state in which the second voltage V2 is applied to the liquid crystal 62, the photocurable resin RL of the region corresponding to the second region 52b does not cure. However, in the third state in which the third voltage V3 is applied to the liquid crystal 62 and in the fourth state in which the fourth voltage V4 is applied to the liquid crystal 62, the photocurable resin RL of the region corresponding to the second region 52b cures.

Figure 6:
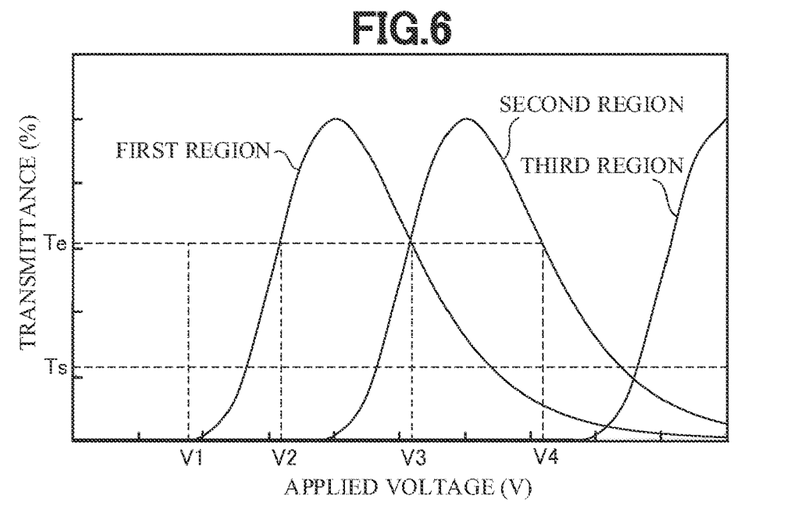
FIG. 6 is a drawing illustrating voltage transmittance characteristics of a first region, a second region, and a third region according to Embodiment 1.

As illustrated in FIG. 6, the transmittance of the third region 52c where the drive voltage is highest is less than the critical transmittance Ts when any of the first voltage V1 to the fourth voltage V4 is applied. Note that the photocurable resin RL located directly above the third region 52c is included in the photocurable resin RL of the region corresponding to the first region 52a or the photocurable resin RL of the region corresponding to the second region 52b.

To summarize, in the first state in which the first voltage V1 is applied to the liquid crystal 62, the transmittances of the first region 52a, the second region 52b, and the third region 52c are less than the critical transmittance Ts and, as such, the photocurable resin RL of the regions corresponding to all of the regions does not cure. In the second state in which the second voltage V2 is applied to the liquid crystal 62, the transmittance of the first region 52a is greater than or equal to the critical transmittance Ts, and the transmittances of the second region 52b and the third region 52c are less than the critical transmittance Ts and, as such, the photocurable resin RL of the region corresponding to the first region 52a cures. In the third state in which the third voltage V3 is applied to the liquid crystal 62, the transmittances of the first region 52a and the second region 52b are greater than or equal to the critical transmittance Ts, and the transmittance of the third region 52c is less than the critical transmittance Ts and, as such, the photocurable resin RL of the region corresponding to the first region 52a and the photocurable resin RL of the region corresponding to the second region 52b cure. In the fourth state in which the fourth voltage V4 is applied to the liquid crystal 62, the transmittances of the first region 52a and the third region 52c are less than the critical transmittance Ts, and the transmittance of the second region 52b is greater than or equal to the critical transmittance Ts and, as such, the photocurable resin RL of the region corresponding to the second region 52b cures.

Accordingly, in the present embodiment, by controlling the voltage applied to the liquid crystal 62 of one modulation region 52, thereby controlling the transmittances of two regions (the first region 52a and the second region 52b) within the modulation region 52, it is possible to control whether the photocurable resin RL of the region corresponding to each region is caused to cure. Since it is possible to control, by one modulation region 52, whether the photocurable resin RL of regions corresponding to two regions within the modulation region 52 is caused to cure, the number of driver ICs 85 of the optical modulator 50 can be reduced. Additionally, the driver circuits 82 of the optical modulator 50 can be simplified.

The transmittance of the first region 52a in the second state, the transmittance of the first region 52a in the third state, the transmittance of the second region 52b in the third state, and the transmittance of the second region 52b in the fourth state (hereinafter collectively referred to as "exposure transmittance Te") are dependent on the thickness of the photocurable resin RL to be caused to cure. Specifically, the thickness of the photocurable resin RL to be cured depends on the energy per unit area (hereinafter referred to as "curing exposure amount") of the emitted curing light and, as such, the exposure transmittance Te is set to a transmittance at which the curing light, which has a curing exposure amount that corresponds to the thickness of the photocurable resin RL to be cured, transmits. In one example, when the curing exposure amount for causing urethane-acrylate photocurable resin to cure at a thickness of 100 μm is 2 mJ/cm$^2$, the exposure transmittance Te is set to the transmittance at which the exposure amount of the transmitted curing light is 2 mJ/cm$^2$.

In the present embodiment, it is preferable that the sum of the areas of regions 51 of the first region 52a that transmit the curing light and the sum of the areas of regions S2 of the second region 52b that transmit the curing light are equal. Furthermore, it is preferable that, as illustrated in FIG. 6, the exposure transmittances Te at the second voltage V2 (the second state), the third voltage V3 (the third state), and the fourth voltage V4 (the fourth state) are set to be equal. Such configurations make it possible to easily control the curing exposure amount of the curing light irradiated on the photocurable resin RL, and make it possible to uniformly cure the photocurable resin RL.

Figure 7:
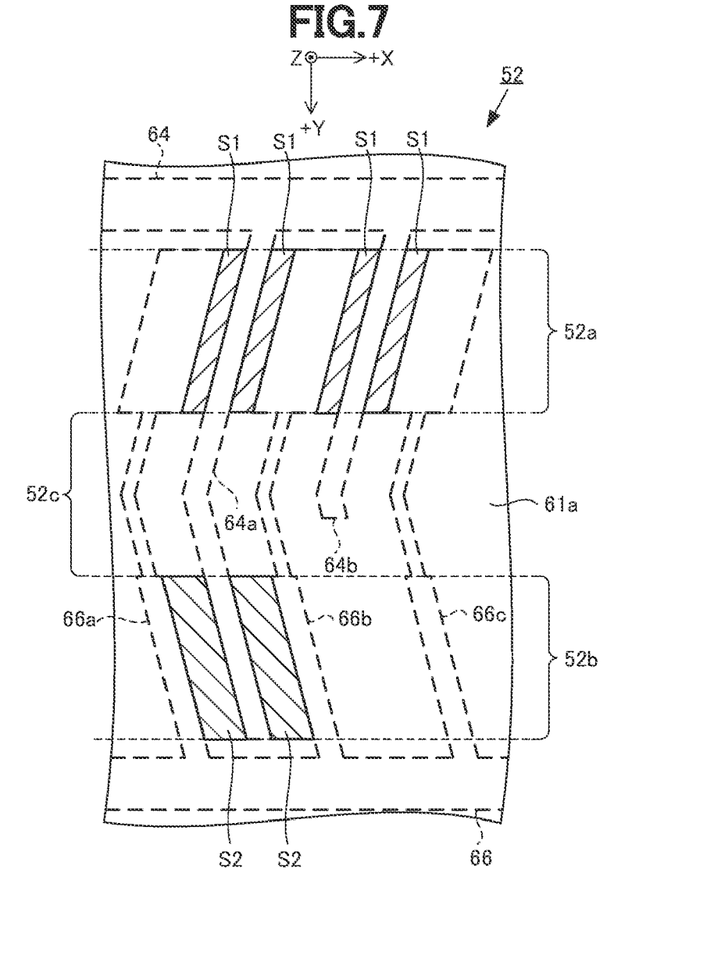
FIG. 7 is a plan view illustrating regions, of the first region and the second region, that transmit curing light according to Embodiment 1.

As illustrated in FIG. 7, "the regions 51 of the first region 52a that transmit the curing light" refers to regions, in the first region 52a, between the electrodes (the comb teeth 64a to 64c, and 66a, 66b) where the transverse electric field is generated. Additionally, "the regions S2 of the second region 52b that transmit the curing light" refers to regions, in the second region 52b, between the electrodes (the comb teeth 64a, 66a, 66b) where the transverse electric field is generated. In the present embodiment, the comb tooth 64b of the first electrode 64 is not disposed in the second region 52b. Due to this, the sum of the areas of the regions S1 and the sum of the areas of the regions S2 are made equal. In FIG. 7, to facilitate comprehension, the first polarizing plate 72, the second polarizing plate 74, and the like are not illustrated, and the first electrode 64 and the second electrode 66 are represented by dashed lines.

Returning to FIG. 1, the controller 90 of the optical forming device 100 controls the mover 30, the light source 40, and the optical modulator 50. Additionally, the controller 90 generates, from three-dimensional shape data expressing the three-dimensional shape of the three-dimensional object Ob, cross-sectional shape data expressing the shape of a cross-section, perpendicular to the +Z-direction, of the three-dimensional object Ob. The cross-sectional shape data is generated at a predetermined interval.

The controller 90 includes a central processing unit (CPU) 92 that executes various processing, a read only memory (ROM) 94 that stores programs and data, a random access memory (RAM) 96 that stores data, and an input/output interface 98 that inputs and outputs signals to and from the various components. The CPU 92 executes the programs stored in the ROM 94 to realize the functions of the controller 90. The input/output interface 98 inputs and outputs signals to and from the CPU 92, and the mover 30, the light source 40, the driver IC 85 of the optical modulator 50, and a non-illustrated external device.

Figure 8:
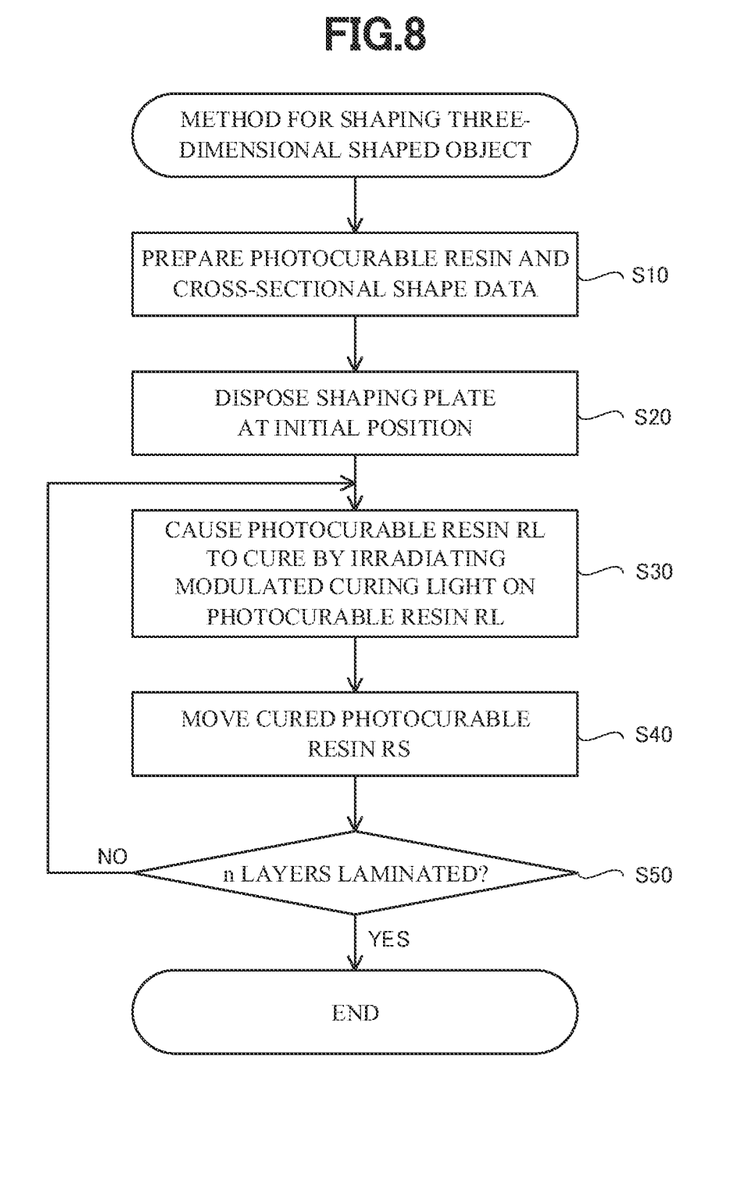
FIG. 8 is a flowchart illustrating a method for shaping the three-dimensional shaped object according to Embodiment 1.

Next, a method for shaping the three-dimensional object Ob is described while referencing FIG. 8. In the present embodiment, the three-dimensional object Ob is shaped by laminating n layers of photocurable resin RS that have been cured by the optical forming device 100.

FIG. 8 is a flowchart illustrating the method for shaping the three-dimensional object Ob. The method for shaping the three-dimensional object Ob includes a step of preparing the photocurable resin RL and the cross-sectional shape data (step S10), a step of disposing the shaping plate 20 at the initial position (step S20), a step of causing the photocurable resin RL to cure by modulating the curing light and irradiating the photocurable resin RL with the modulated curing light (step S30), a step of moving the cured photocurable resin RS (step S40), and a step of determining whether n layers of the cured photocurable resin RS are laminated (step S50). In the present embodiment, step S30 and step S40 are repeated.

In step S10, the photocurable resin RL for shaping the three-dimensional object Ob, and the cross-sectional shape data of the three-dimensional object Ob are prepared. In the present embodiment, the photocurable resin RL is implemented as a UV-curable resin. The cross-sectional shape data is generated by the controller 90 of the optical forming device 100 from three-dimensional shape data of the three-dimensional object Ob that is input from an external device. n layers of the cross-sectional shape data are generated. In one example, the three-dimensional shape data is three-dimensional computer-aided design (CAD) data of the three-dimensional object Ob.

In step S20, the shaping plate 20 is moved by the mover 30 to dispose the shaping plate 20 at the initial position. Specifically, the shaping plate 20 is disposed at a position where the spacing between the face 20a on which the three-dimensional object Ob is shaped and the bottom 12 of the resin tank 10 is the thickness of one layer of the cured photocurable resin RS.

In step S30, UV light is emitted from the light source 40. The emitted UV light is modulated by the optical modulator 50 on the basis of the cross-sectional shape data of the first layer. The modulated UV light is irradiated on the photocurable resin RL through the bottom 12 of the resin tank 10. As a result, the photocurable resin RL cures to form a first layer of the cured photocurable resin RS.

In the optical modulator 50, by controlling the voltage applied to the liquid crystal 62 of the selected modulation region 52, it possible to control whether the photocurable resin RL corresponding to two regions (the first region 52a and the second region 52b) in one modulation region 52 is cured. As such, the photocurable resin RS can be formed with a simple configuration.

In step S40, the mover 30 moves the cured photocurable resin RS (the shaping plate 20) in the +Z-direction an amount corresponding to the thickness of the layer of the cured photocurable resin RS.

In step S50, when the number of times step S30 has been executed is less than n times, a determination is made that n layers of the cured photocurable resin RS is not laminated (step S50; NO). When a determination is made that n layers have not been laminated, step S30 of the shaping processing is executed and the cured photocurable resin RS of the second or subsequent layer is formed. When the number of times that step S30 has been executed is n times, it is determined that n layers of the cured photocurable resin RS is laminated (step S50; YES), and the shaping processing is ended. Thus, the optical forming device 100 can shape the three-dimensional object Ob.

As described above, the first region 52a and the second region 52b of the modulation region 52 of the optical modulator 50 have mutually different voltage transmittance characteristics due to the comb teeth 64a, 64b of the first electrode 64 and the comb teeth 66a, 66b, 66c of the second electrode 66 having different spacings. Specifically, in the first state in which the first voltage V1 is applied to the liquid crystal 62, the first region 52a and the second region 52b have transmittances that are less than the critical transmittance Ts. In the second state in which the second voltage V2 is applied to the liquid crystal 62, the first region 52a has a transmittance that is greater than or equal to the critical transmittance Ts and the second region 52b has a transmittance that is less than the critical transmittance Ts. In the third state in which the third voltage V3 is applied to the liquid crystal 62, the first region 52a and the second region 52b have transmittances that are greater than or equal to the critical transmittance Ts. In the fourth state in which the fourth voltage V4 is applied to the liquid crystal 62, the first region 52a has a transmittance than is less than the critical transmittance Ts and the second region 52b has a transmittance that is greater than or equal to the critical transmittance Ts.

The transmittances of the first region 52a and the second region 52b of the modulation region 52 are controlled by the voltage applied to the liquid crystal 62, thereby making it possible to control whether the photocurable resin RL of the region corresponding to each of the regions is cured. As such, the number of driver ICs 85 of the optical modulator 50 can be reduced. Additionally, the driver circuits 82 of the optical modulator 50 can be simplified. Therefore, the optical forming device 100 can, with a simple configuration, shape a shaped object having a wide cross-sectional area at a high resolution.

Embodiment 2

In the optical forming device 100 of Embodiment 1, the first region 52a and the second region 52b of the modulation region 52 have mutually different voltage transmittance characteristics due to the spacings between the comb teeth 64a, 64b, and 66a to 66c being different. The first region 52a and the second region 52b of the modulation region 52 may be provided with mutually different voltage transmittance characteristics by other configurations.

Figure 9:
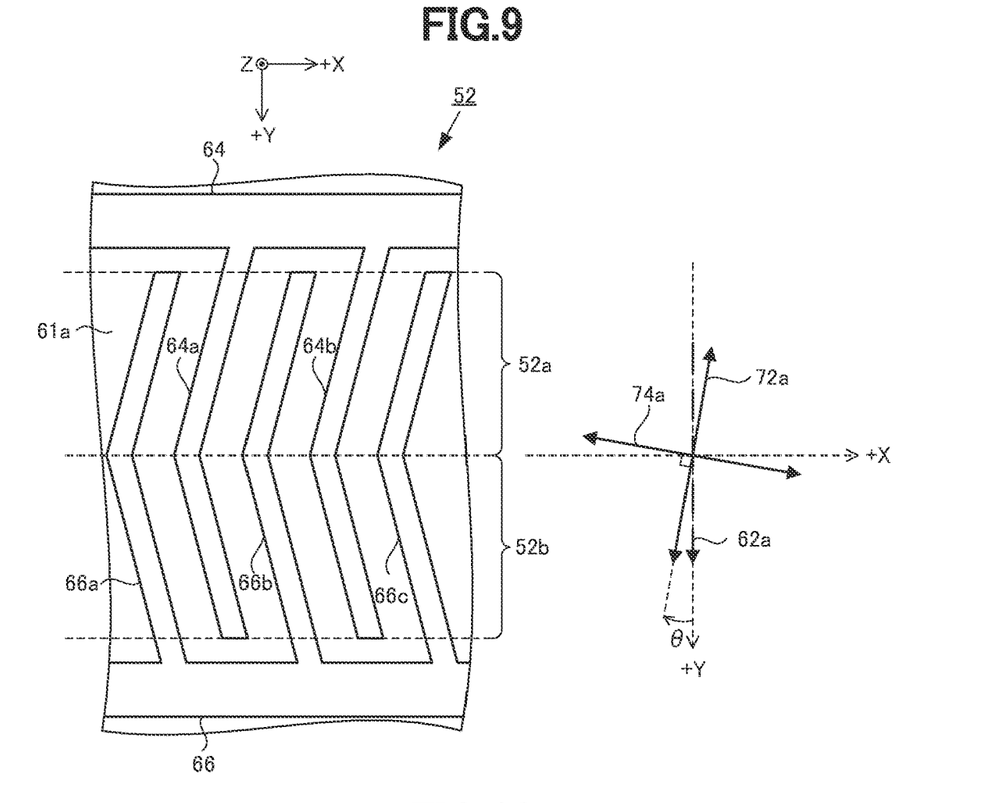
FIG. 9 is a plan view illustrating a modulation region, a polarization axis of a first polarizing plate, and a polarization axis of a second polarizing plate according to Embodiment 2.
Figure 10:
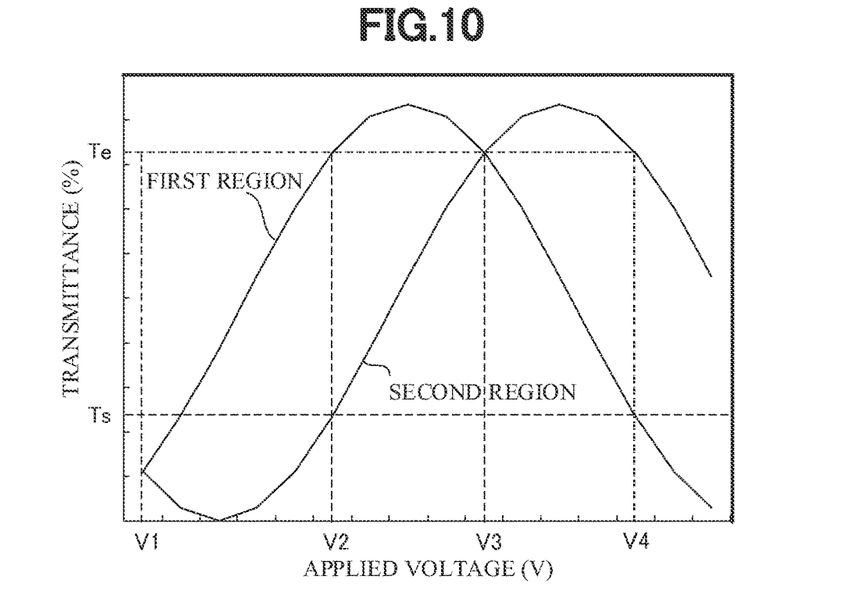
FIG. 10 is a drawing illustrating voltage transmittance characteristics of a first region and a second region according to Embodiment 2, when an angle of inclination θ=10°.
Figure 11:
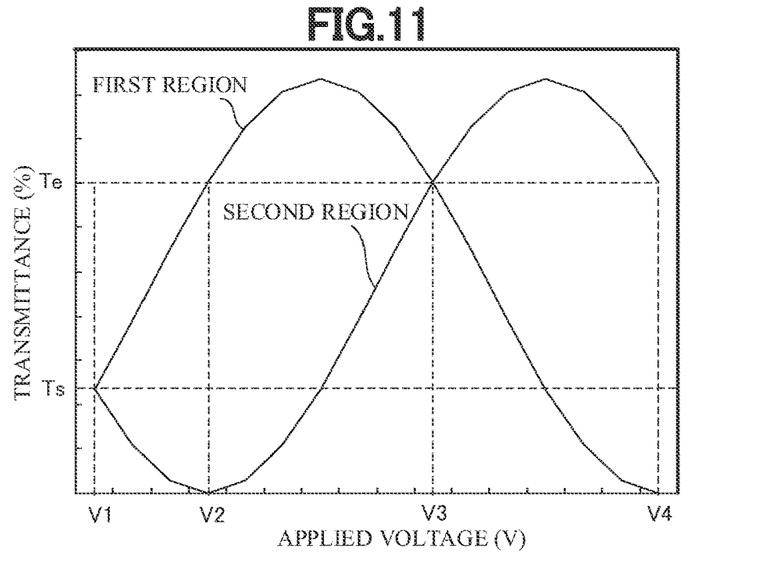
FIG. 11 is a drawing illustrating voltage transmittance characteristics of a first region and a second region according to Embodiment 2, when an angle of inclination θ=15°.

The optical forming device 100 of the present embodiment is described while referencing FIGS. 9 to 11. As with the optical forming device 100 of Embodiment 1, the optical forming device 100 of the present embodiment includes a resin tank 10, a shaping plate 20, a mover 30, a light source 40, an optical modulator 50, and a controller 90. In the present embodiment, the configurations of the first electrode 64, the second electrode 66, the first polarizing plate 72, and the second polarizing plate 74 of the optical modulator 50 differ from those in Embodiment 1. As such, these components and the modulation regions 52 are described.

As in Embodiment 1, the first electrode 64 and the second electrode 66 of the present embodimen are formed in a comb tooth shape from ITO on the first main surface 61a of the first substrate 61. As illustrated in FIG. 9, the first electrode 64 extends in an alignment direction 62a (the +Y-direction) of the liquid crystal 62. Additionally, the first electrode 64 includes comb teeth 64a, 64b that are bent in a V-shape. The second electrode 66 extends in the direction opposite the comb teeth 64a, 64b of the first electrode 64 (the −Y-direction). The second electrode 66 includes comb teeth 66a, 66b, 66c that are bent in a V-shape. The comb teeth 66a, 66b, 66c of the second electrode 66 and the comb teeth 64a, 64b of the first electrode 64 are arranged alternately, equally spaced in the X-direction and parallel to each other. Due to this configuration, as in Embodiment 1, a transverse electric field in the X-direction and parallel to the first main surface 61a is generated between the comb tooth 66a and the comb tooth 64a, between the comb tooth 64a and the comb tooth 66b, between the comb tooth 66b and the comb tooth 64b, and between the comb tooth 64b and the comb tooth 66c. The liquid crystal 62 rotates in a plane parallel to the first main surface 61a of the first substrate 61 due to the transverse electric field in the X-direction and parallel to the first main surface 61a.

As in Embodiment 1, the first polarizing plate 72 of the present embodiment is provided on the second main surface 61b of the first substrate 61. In the present embodiment, as illustrated in FIG. 9, a polarization axis 72a of the first polarizing plate 72 is inclined at an angle of inclination θ with respect to the alignment direction 62a (the +Y-direction) of the liquid crystal 62.

As in Embodiment 1, the second polarizing plate 74 of the present embodiment is provided on the second main surface 71b of the second substrate 71. As in Embodiment 1, the polarization axis 74a of the second polarizing plate 74 is disposed in a cross-Nicol alignment with respect to the polarization axis 72a of the first polarizing plate 72.

In the present embodiment, the comb teeth 64a, 64b of the first electrode 64 and the comb teeth 66a to 66c of the second electrode 66 are bent in a V-shape, and the polarization axis 72a of the first polarizing plate 72 is inclined with respect to the alignment direction of the liquid crystal 62. As such, a first region 52a and a second region 52b that have mutually different voltage transmittance characteristics are generated in each of the modulation regions 52. The first region 52a and the second region 52b are divided at the bends of the comb teeth 64a, 64b, and 66a to 66c. The first region 52a is located on the root side (the −Y-direction side) of the comb teeth 64a, 64b, and the second region 52b is located on the root side (the +Y-direction side) of the comb teeth 66a to 66c of the second electrode 66.

Next, the voltage transmittance characteristics of the first region 52a and the second region 52b of the present embodiment are described. FIG. 10 illustrates the voltage transmittance characteristics of the first region 52a and the second region 52b when the angle of inclination θ=10°.

When θ=10°, as illustrated in FIG. 10, the first region 52a of the present embodiment has the same voltage transmittance characteristics as the first region 52a of Embodiment 1. Specifically, in the first state in which the first voltage V1 is applied to the liquid crystal 62, the transmittance of the first region 52a is less than the critical transmittance Ts. In the second state in which the second voltage V2 is applied to the liquid crystal 62, the transmittance of the first region 52a is greater than or equal to the critical transmittance Ts. In the third state in which the third voltage V3 is applied to the liquid crystal 62, the transmittance of the first region 52a is greater than or equal to the critical transmittance Ts. In the fourth state in which the fourth voltage V4 is applied to the liquid crystal 62, the transmittance of the first region 52a is less than the critical transmittance Ts.

When θ=10°, the second region 52b of the present embodiment also has the same voltage transmittance characteristics as the second region 52b of Embodiment 1. Specifically, in the first state in which the first voltage V1 is applied to the liquid crystal 62, the transmittance of the second region 52b is less than the critical transmittance Ts. In the second state in which the second voltage V2 is applied to the liquid crystal 62, the transmittance of the second region 52b is less than the critical transmittance Ts. In the third state in which the third voltage V3 is applied to the liquid crystal 62, the transmittance of the second region 52b is greater than or equal to the critical transmittance Ts. In the fourth state in which the fourth voltage V4 is applied to the liquid crystal 62, the transmittance of the second region 52b is greater than or equal to the critical transmittance Ts.

Accordingly, as in Embodiment 1, in the present embodiment as well, by controlling the voltage applied to the liquid crystal 62 of one modulation region 52, it is possible to control the transmittances of the first region 52a and the second region 52b within the modulation region 52 and, thereby control whether the photocurable resin RL of the region corresponding to each region is caused to cure. Since it is possible to control, by the voltage applied to the liquid crystal 62, whether the photocurable resin RL of the regions corresponding to the first region 52a and the second region 52b within the modulation region 52 is caused to cure, the number of driver ICs 85 of the optical modulator 50 can be reduced. Additionally, the driver circuits 82 of the optical modulator 50 can be simplified.

FIG. 11 illustrates the voltage transmittance characteristics of the first region 52a and the second region 52b when the angle of inclination θ=15°. When the angle of inclination θ=15°, as illustrated in FIG. 11, the first region 52a of the present embodiment has the same voltage transmittance characteristics as the first region 52a of Embodiment 1. The second region 52b of the present embodiment also has the same voltage transmittance characteristics as the second region 52b of Embodiment 1. However, as illustrated in FIG. 11, it is difficult to increase the ratio of the exposure transmittance Te to the critical transmittance Ts (Te/Ts). When the ratio of the exposure transmittance Te to the critical transmittance Ts is small, it is not possible to increase the thickness of the cured photocurable resin RL. Accordingly, it is preferable that the angle of inclination θ is greater than 0° and less than 15°.

As described above, in the present embodiment, it is possible to reduce the number of driver ICs 85 of the optical modulator 50, and simplify the driver circuits 82 of the optical modulator 50. Therefore, the optical forming device 100 of the present embodiment can, with a simple configuration, shape a shaped object having a wide cross-sectional area at a high resolution.

Modified Examples

Embodiments have been described, but various modifications can be made to the present disclosure without departing from the spirit and scope of the present disclosure.

Figure 12:
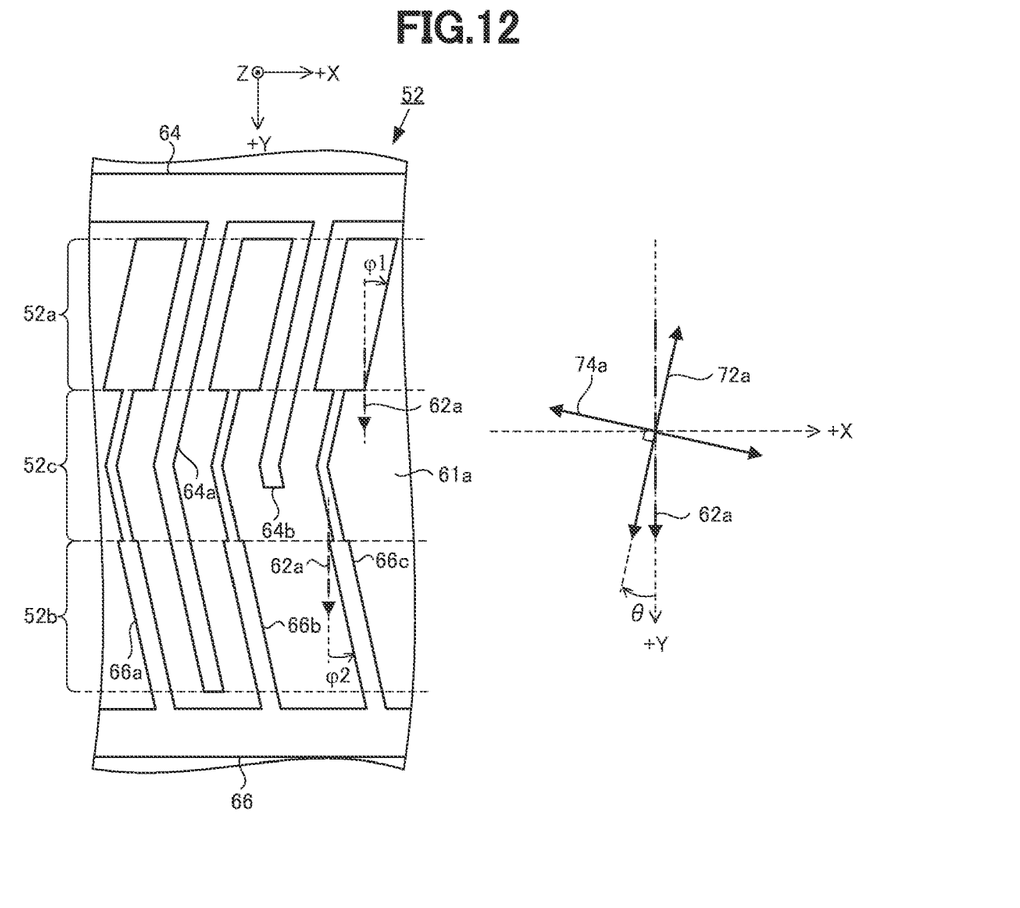
FIG. 12 is a plan view illustrating a modulation region, a polarization axis of a first polarizing plate, and a polarization axis of a second polarizing plate according to a modified example.
Figure 13:
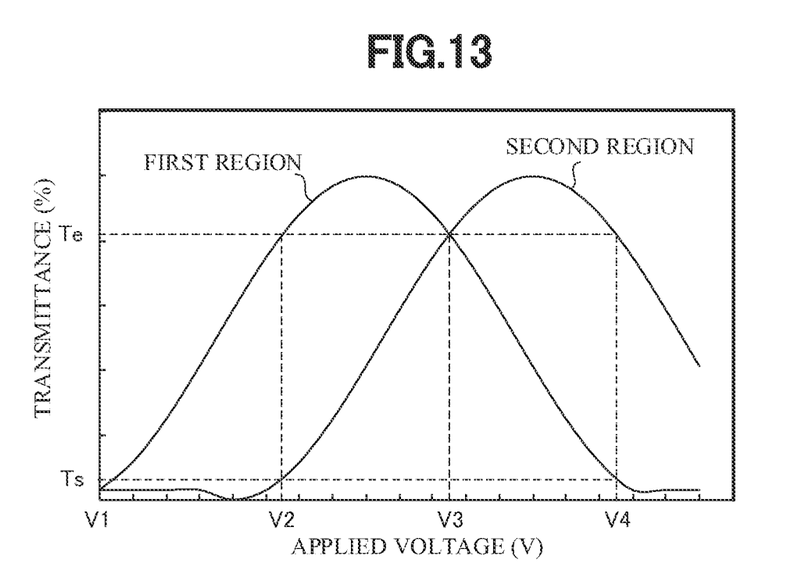
FIG. 13 is a drawing illustrating voltage transmittance characteristics of a first region and a second region according to a modified example.

For example, in Embodiment 1, the polarization axis 72a of the first polarizing plate 72 is disposed parallel to the alignment direction 62a (the +Y-direction) of the liquid crystal 62, and the polarization axis 74a of the second polarizing plate 74 is disposed in a cross-Nicol alignment with respect to the polarization axis 72a of the first polarizing plate 72. However, a configuration is possible in which the polarization axis 72a of the first polarizing plate 72 of Embodiment 1 is inclined at the angle of inclination θ with respect to the alignment direction 62a of the liquid crystal 62, similar to the polarization axis 72a of Embodiment 2. For example, as illustrated in FIG. 12, a configuration is possible in which, with respect to the alignment direction 62a of the liquid crystal 62, the comb teeth 64a, 64b of the first electrode 64 are inclined 5° in the clockwise direction (angle of inclination φ1=5°), the comb teeth 66a to 66c of the second electrode 66 are inclined 5° in the counterclockwise direction (angle of inclination φ2=5°), and the polarization axis 72a of the first polarizing plate 72 is inclined 5° in the clockwise direction (angle of inclination θ=5°). In this case, as illustrated in FIG. 13, the ratio of the exposure transmittance Te to the critical transmittance Ts can be increased.

A configuration is possible in which the comb teeth 64a, 64b, and 66a to 66c of Embodiment 1 are not bent. Additionally, a configuration is possible in which the third region 52c of Embodiment 1 is covered by the black matrix BM of the counter substrate 70.

The bottom 12 of the resin tank 10 of Embodiment 1 is formed from flat plate-like glass, but a configuration is possible in which the bottom 12 of the resin tank 10 is formed from a resin that transmits the curing light, a polymer film that transmits the curing light, or the like. Additionally, a configuration is possible in which the bottom 12 that is formed from glass, resin, or the like is subjected to a releasing treatment (for example, silicon coating treatment). With such a configuration, the cured photocurable resin RS can be prevented from adhering to the bottom 12.

The photocurable resin RL is not limited to a UV-curable resin. For example, a configuration is possible in which the photocurable resin RL is a resin that cures as a result of being irradiated with visible light. Additionally, a configuration is possible in which the photocurable resin RL includes a polymerization inhibitor, metal particles, a pigment, and the like.

The light emitted from the light source 40 is not limited to UV light. The light source 40 emits light (the curing light) that causes the photocurable resin RL to cure. A configuration is possible in which the light source 40 emits visible light in accordance with the wavelength at which the polymerization initiator included in the photocurable resin RL generates an active species. Additionally, a configuration is possible in which the light source 40 includes a lamp instead of the LED. Furthermore, a configuration is possible in which the light source 40 includes a collimator that changes the curing light to parallel light.

In Embodiments 1 and 2, the first polarizing plate 72 and the second polarizing plate 74 are disposed in a cross-Nicol alignment and the optical modulator 50 is caused to operate in a normally black mode. However, a configuration is possible in which the first polarizing plate 72 and the second polarizing plate 74 are disposed in a parallel Nicol alignment and the optical modulator 50 is caused to operate in a normally white mode. Additionally, the optical modulator 50 of Embodiments 1 and 2 operates in an in-plane switching mode, but a configuration is possible in which the optical modulator 50 operates in other transverse electric field modes. For example, a configuration is possible in which the optical modulator 50 operates in a fringe field switching mode.

In Embodiment 1 the optical forming device 100 sequentially laminates layers of the cured photocurable resin RS to shape the three-dimensional object Ob. However, a configuration is possible in which the optical forming device 100 continuously irradiates the photocurable resin RL with the curing light by the optical modulator 50 while continuously moving the shaping plate 20 to continuously shape the three-dimensional object Ob.

A configuration is possible in which the optical modulators 50 of Embodiments 1 and 2 and the modified examples function as optical modulation devices that modulate incident light and emit modulated light. For example, a configuration is possible in which the optical modulator 50 is used as an optical modulation device (display device) that displays characters, images, and the like.

The foregoing describes some example embodiments for explanatory purposes.

Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An optical forming device, comprising:
   a resin tank that holds a photocurable resin;
   a light source that emits light for curing the photocurable resin; and
   an optical modulator that includes a liquid crystal, a first substrate and a second substrate that sandwich the liquid crystal, and a first electrode and a second electrode that apply voltage to the liquid crystal, modulates the light in a pattern based on a shape of a three-dimensional shaped object, and irradiates the modulated light on the photocurable resin, wherein
   the optical modulator includes a plurality of modulation regions including a first region and a second region that have mutually different voltage transmittance characteristics,
   the liquid crystal is aligned in a direction parallel to a main surface of the first substrate and the first electrode and the second electrode apply voltage to the liquid crystal to rotate the liquid crystal in a plane parallel to the main surface of the first substrate,
   in a first state in which a predetermined first voltage is applied to the liquid crystal, the first region and the second region have transmittances that are lower than a predetermined transmittance,
   in a second state in which a predetermined second voltage is applied to the liquid crystal, the first region has a transmittance that is greater than or equal to the predetermined transmittance, and the second region has a transmittance that is lower than the predetermined transmittance,
   in a third state in which a predetermined third voltage is applied to the liquid crystal, the first region and the second region have transmittances that are greater than or equal to the predetermined transmittance,
   in a fourth state in which a predetermined fourth voltage is applied to the liquid crystal, the first region has a transmittance that is less than the predetermined transmittance, and the second region has a transmittance that is greater than or equal to the predetermined transmittance, and
   the photocurable resin cures when the transmittance of the first region or the second region is greater than or equal to the predetermined transmittance.

2. The optical forming device according to claim 1, wherein an area of a region of the first region that transmits the light and an area of a region of the second region that transmits the light are equal.

3. The optical forming device according to claim 1, wherein the transmittance of the first region in the second state, the transmittances of the first region and the second region in the third state, and the transmittance of the second region in the fourth state are equal.

4. The optical forming device according to claim 1, wherein
   the first electrode and the second electrode have a comb-tooth shape, and
   when the optical modulator is viewed from above, a comb-tooth of the first electrode and a comb-tooth of the second electrode are alternately disposed, parallel to each other.

5. The optical forming device according to claim 4, wherein when the optical modulator is viewed from above, a spacing between the comb-tooth of the first electrode and the comb-tooth of the second electrode in the first region is narrower than a spacing between the comb-tooth of the first electrode and the comb-tooth of the second electrode in the second region.

6. The optical forming device according to claim 5, further comprising:
   a first polarizing plate provided on the first substrate, and a second polarizing plate that is provided on the second substrate and that is disposed in a cross-Nicol alignment with respect to the first polarizing plate, wherein
   the comb-tooth of the first electrode extends in an alignment direction of the liquid crystal and is bent in a V-shape, the comb-tooth of the second electrode extends in a direction opposite the comb-tooth of the first electrode and is bent in a V-shape, the comb-tooth of the first electrode and the comb-tooth of the second electrode in the first region are inclined 5° with respect to the alignment direction of the liquid crystal, the comb-tooth of the first electrode and the comb-tooth of the second electrode in the second region are inclined 5° opposite the comb-tooth of the first electrode and the comb-tooth of the second electrode in the first region, and one of a polarization axis of the first polarizing plate and a polarization axis of the second polarizing plate is inclined 5° with respect to the alignment direction of the liquid crystal, in a same direction as the comb-tooth of the first electrode and the comb-tooth of the second electrode in the first region.

7. The optical forming device according to claim 4, further comprising:

a first polarizing plate provided on the first substrate, and a second polarizing plate provided on the second substrate, wherein the comb-tooth of the first electrode and the comb-tooth of the second electrode are bent in a V-shape, and one of a polarization axis of the first polarizing plate and a polarization axis of the second polarizing plate is inclined greater than 0° and less than 15° with respect to an alignment direction of the liquid crystal.

8. An optical modulation device comprising:

a plurality of modulation regions that includes a first region and a second region that have mutually different voltage transmittance characteristics, and that modulates incident light; and a liquid crystal, a first substrate and a second substrate that sandwich the liquid crystal, and a first electrode and a second electrode that apply voltage to the liquid crystal, wherein the first electrode and the second electrode have a comb tooth shape, in a plan view, a comb-tooth of the first electrode and a comb-tooth of the second electrode are alternately disposed, parallel to each other, and a spacing between the comb-tooth of the first electrode and the comb-tooth of the second electrode in the first region is narrower than a spacing between the comb-tooth of the first electrode and the comb-tooth of the second electrode in the second region, the liquid crystal is aligned in a direction parallel to a main surface of the first substrate and the first electrode and the second electrode apply voltage to the liquid crystal to rotate the liquid crystal in a plane parallel to the main surface of the first substrate, in a first state in which a predetermined first voltage is applied to the liquid crystal, the first region and the second region have transmittances that are lower than a predetermined transmittance, in a second state in which a predetermined second voltage is applied to the liquid crystal, the first region has a transmittance that is greater than or equal to the predetermined transmittance, and the second region has a transmittance that is lower than the predetermined transmittance, in a third state in which a predetermined third voltage is applied to the liquid crystal, the first region and the second region have transmittances that are greater than or equal to the predetermined transmittance, and in a fourth state in which a predetermined fourth voltage is applied to the liquid crystal, the first region has a transmittance that is less than the predetermined transmittance, and the second region has a transmittance that is greater than or equal to the predetermined transmittance.

9. The optical modulation device according to claim 8, further comprising:

a first polarizing plate provided on the first substrate, and a second polarizing plate that is provided on the second substrate and that is disposed in a cross-Nicol alignment with respect to the first polarizing plate, wherein the comb-tooth of the first electrode extends in an alignment direction of the liquid crystal and is bent in a V-shape, the comb-tooth of the second electrode extends in a direction opposite the comb-tooth of the first electrode and is bent in a V-shape, the comb-tooth of the first electrode and the comb-tooth of the second electrode in the first region are inclined 5° with respect to the alignment direction of the liquid crystal, the comb-tooth of the first electrode and the comb-tooth of the second electrode in the second region are inclined 5° opposite the comb-tooth of the first electrode and the comb-tooth of the second electrode in the first region, and one of a polarization axis of the first polarizing plate and a polarization axis of the second polarizing plate is inclined 5° with respect to the alignment direction of the liquid crystal, in a same direction as the comb-tooth of the first electrode and the comb-tooth of the second electrode in the first region.

10. The optical modulation device according to claim 8, wherein the plan view is a view that perpendicularly intersects a plain comprising a first axis and a second axis perpendicular to the first axis, wherein along the first axis the comb-tooth of the first electrode and the comb-tooth of the second electrode are parallel to each other, and wherein along the second axis the spacing between the comb-tooth of the first electrode and the comb-tooth of the second electrode in the first region is narrower than the spacing between the comb-tooth of the first electrode and the comb-tooth of the second electrode in the second region.

* * * * *